United States Patent [19]

Shekleton et al.

[11] Patent Number: 5,209,056
[45] Date of Patent: May 11, 1993

[54] STORED ENERGY, WIDE ENERGY RANGE TURBINE STARTING ENGINE

[75] Inventors: Jack R. Shekleton, San Diego, Calif.; Robert W. Smith, Rockford, Ill.

[73] Assignee: Sundstrand Corporation, Rockford, Ill.

[21] Appl. No.: 822,306

[22] Filed: Mar. 6, 1992

Related U.S. Application Data

[62] Division of Ser. No. 447,444, Dec. 7, 1989, Pat. No. 5,136,888.

[51] Int. Cl.[5] ............................. F02C 7/26; F02C 7/18
[52] U.S. Cl. ................................ 60/39.06; 60/39.141; 431/6
[58] Field of Search ............. 60/39.06, 39.141, 39.142, 60/39.23, 727; 431/6, 12

[56] References Cited

U.S. PATENT DOCUMENTS

| 2,611,239 | 9/1952 | Briggs | 60/39.141 |
| 2,742,758 | 4/1956 | Kelly | 60/39.141 |
| 2,858,672 | 11/1958 | Clark | 60/39.141 |
| 4,041,694 | 8/1977 | Lewis | 60/39.281 |
| 4,815,277 | 3/1989 | Vershure et al. | 60/39.142 |
| 4,864,812 | 9/1989 | Rodgers et al. | 60/727 |
| 5,009,589 | 4/1991 | Shekleton et al. | 60/742 |

Primary Examiner—Louis J. Casaregola
Attorney, Agent, or Firm—Wood, Phillips, VanSanten, Hoffman & Ertel

[57] ABSTRACT

Difficulties with starting reliability and/or combustion stability in hot gas generating systems are avoided in a construction including a storage vessel (36) for storing an oxidant, a fuel supply (22) and combustion chamber (26) having an out outlet (30) for hot gas. A fuel injection nozzle (28) provides fuel from the supply (22) to the combustion chamber (26) while an oxidant duct (44) connects the vessel (36) to the combustion chamber (26). A choked orifice (46) is disposed in the duct (44) just upstream of the combustion chamber (26) and a bypass duct (50) interconnects the combustion chamber outlet (30) and the oxidant duct (44) between the choke orifice (46) and the combustion chamber (26). A selectively operable valve (53) is disposed in the bypass duct (50) and a pressure regulator (44) is disposed in the oxidant duct (44) for selectively controlling the pressure of oxidant applied to the choked orifice (46).

5 Claims, 1 Drawing Sheet

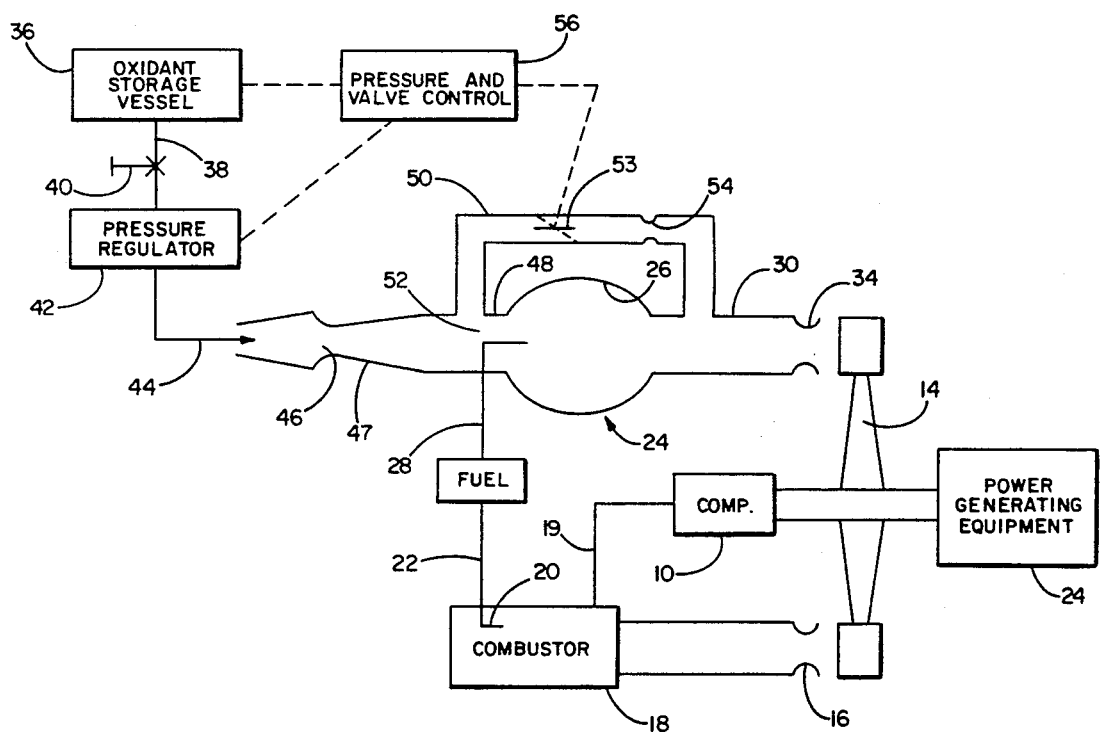

STORED ENERGY, WIDE ENERGY RANGE TURBINE STARTING ENGINE

This is a division of application Ser. No. 07/447,444 filed Dec. 7, 1989 (U.S. Pat. No. 5,436,888).

FIELD OF THE INVENTION

This invention relates to turbine engines, and more specifically, to starting systems for turbine engines.

BACKGROUND OF THE INVENTION

Increased sophistication in aircraft has resulted in so-called "fly-by-wire" aircraft wherein the controls operated by the pilot and the control surfaces responsive to such controls are not directly mechanically coupled. Rather, the same may be coupled by electrical or hydraulic systems That in turn requires that electrical or hydraulic energy be available at all times or else the link between the controls and the control surfaces is lost.

Consequently, such aircraft require advanced airborne secondary power systems that are operable to provide the requisite electrical or hydraulic energy in a very short period of time following failure of a primary power system. For example, the same must be capable of virtually instant start up from an inactive condition, whether at sea level or extremely high altitudes in excess of 50,000 feet. While this requirement does not present a great deal of difficulty at many altitudes, at the high altitudes, where the air is the least dense, starting of a secondary power system, which is typically turbine driven, such that energy therefrom will be available to operate control surfaces in response to control commands within the requisite elapsed time of two or three seconds poses special difficulties.

One prior art proposal includes the use of hydrazine which is stored on board the aircraft. The hydrazine is applied to a catalytic chamber wherein it decomposes and generates gas under pressure sufficient to drive a turbine wheel and accelerate the same to the point where turbine operation can become self-sustaining at high altitudes. While this works well, storage of unstable material such as hydrazine aboard aircraft is not desirable and the same requires special handling and may not be readily available for use at remote sites.

To obtain the benefits of a stored energy system while avoiding the difficulties that accompany the use of material such as hydrazine, it has been proposed to provide an auxiliary combustor in which the usual fuel employed to power the aircraft is combusted with a stored oxidant which may be air, oxygen enriched air or even, in some instances, molecular oxygen. Because of the need for rapid start up of such systems, substantial gas flows from the auxiliary combustor may be required to achieve the desired acceleration of the turbine wheel so that the secondary system may be generating the required amount of electrical or hydraulic energy within two or three seconds. Kenney et al, in U.S. Pat. No. 2,873,577 issued Feb. 17, 1959 recognized that the flow rate of a combustible mixture in a combustor of a gas driven turbine considerably affects the ignitability of the mixture. And of course, it has long been recognized that flame stability in a combustor of a gas driven turbine is likewise affected by flow rates. Further, since the flow rate of the combustible mixture through the combustor will affect the flow rate of the products of combustion from the combustor to the turbine, the flow rate factor must be examined.

If one concerns oneself only with the necessary flow rate required to rapidly accelerate the turbine wheel, one may find oneself in the position of having a system wherein the flow rate of the combustible mixture to the combustor is sufficiently high that starting reliability and/or combustion stability are sacrificed. Conversely, if one concerns oneself primarily with starting reliability and combustion stability, the required flow rate for acceleration of the turbine wheel may not be obtained or, if obtained, may require the use of a relatively large combustor. A large combustor will necessarily add weight and volume to the system, something that is not desirable in aircraft installations.

Still another difficulty results from the fact that varying systems have various flow rate requirements. Consequently, to meet these variations, it has been necessary to design a combustor unique to each particular system so as to achieve the desired flow rate, as well as reliable ignition. This, of course, increases the costs because of the need for a unique design for each system.

The present invention is directed to overcoming one or more of the above problems.

SUMMARY OF THE INVENTION

It is the principal object of the invention to provide and new and improved hot gas generating system. More specifically, it is an object of the invention to provide such a system that is ideally suited for starting turbine engines that may be employed in secondary power sources utilized in aircraft.

An exemplary embodiment of the invention achieves the foregoing objects in a hot gas generating system including a storage vessel for storing oxidant, a fuel supply, a combustor including a combustion chamber having an outlet for hot gas, means for providing fuel from the supply to the combustion chamber, an oxidant duct connecting the vessel to the combustion chamber, a choked orifice in the duct just upstream of the combustion chamber, and a bypass duct interconnecting the outlet and a location in the oxidant duct between the orifice and the combustion chamber. Also provided is a selectively operable valve in the bypass duct along with means in the oxidant duct for selectively controlling the pressure of the oxidant applied to the orifice.

As a result of the foregoing construction, high flow rates may be obtained without sacrificing ignitability and/or flame stability by bypassing the combustion chamber with part of the flowing gas stream. Alternatively, the system permits downsizing of the combustion chamber without concern that combustion chamber geometry might undesirably increase flow rates to the point of causing ignition difficulties or flame instability since excess flow can be routed about the combustion chamber to maintain the desired ignitability or flame stability.

According to another facet of the invention, there is provided a turbine starting system for a turbine engine having a compressor, a turbine wheel coupled to the compressor, a nozzle for directing gases of combustion at the turbine wheel, and a combustor for receiving compressed air from the compressor and fuel and combusting the latter to produce gases of combustion for delivery to the nozzle. The system comprises an auxiliary combustor having a fuel inlet and a combustion gas outlet. Means are provided for connecting the outlet to the nozzle of a turbine engine so that the gases of combustion from the auxiliary combustor may be directed to the turbine wheel. A storage vessel for storing an oxidant to combust the fuel in the auxiliary combustor is provided and a conduit is provided which includes a choked orifice just upstream of the auxiliary combustor and interconnects the vessel and the auxiliary combustor so that oxidant may be delivered from the vessel through the orifice to the auxiliary combustor. Means are provided that are selectively operable to establish a parallel flow path about the auxiliary combustor from a point upstream thereof but downstream of the orifice to the outlet.

In a preferred embodiment, the parallel flow path establishing means includes a duct extending between such point and the outlet and a valve within the duct for controlling the flow of oxidant therethrough.

The invention further contemplates the provision of a flow restrictor in the duct that may be selected to balance the flow through the duct and the flow through the auxiliary combustor in a desired manner.

In a highly preferred embodiment of the invention, the foregoing storage system is in combination with a turbine engine.

According to still another facet of the invention, there is provided a stored energy turbine starting system for a turbine engine having a compressor, a turbine wheel coupled to the compressor, a nozzle for directing gases of combustion at the turbine wheel, and a combustor for receiving compressed air from the compressor and fuel and combusting the latter to produce gases of combustion for delivery to the nozzle. The system further includes an auxiliary combustor having a fuel inlet and a combustion gas outlet. Means are provided for connecting the outlet to a nozzle so that gases of combustion from the auxiliary combustor may be directed thereby at the turbine wheel. A storage vessel is provided for storing an oxidant to combust fuel in the auxiliary combustor and a conduit, including a choked orifice just upstream of the auxiliary combustor is provided to interconnect the vessel and the auxiliary combustor so that oxidant may be delivered from the vessel through the orifice to the auxiliary combustor. Means are provided that are selectively operable to establish a desired pressure level of oxidant upstream of the choked orifice for a predetermined operating condition of the system.

In a preferred embodiment, the selectively operable means is operable to apply a relatively high pressure oxidant to the choked orifice upon initiation of operation of the system and upon obtaining ignition of fuel in the auxiliary combustor, reducing the pressure of the oxidant applied to the choked orifice.

In a highly preferred embodiment, the selectively operable means includes a pressure regulator in the conduit along with a control means therefor, the pressure regulator being upstream of the choked orifice.

The invention also envisions a method of achieving a desired ease of ignitability of fuel in a combustor of a particular volume which includes the steps of a) introducing oxidant into the combustor through a choked orifice, and b) regulating the pressure of the oxidant applied to the choked orifice to achieve the desired ease of ignitability A preferred embodiment of the method contemplates that step b) be performed by applying oxidant to the choked orifice at a given pressure until ignition of fuel within the combustor is achieved and thereafter applying oxidant to the choked orifice at a lesser pressure.

Other objects and advantages will become apparent from the following specification taken in connection with the accompanying drawings.

DESCRIPTION OF THE DRAWINGS

The FIGURE is a somewhat schematic view of a hot gas generating system in combination with a turbine engine and made according to the invention.

DESCRIPTION OF THE PREFERRED EMBODIMENT

An exemplary embodiment of a hot gas generating system made according to the invention is illustrated in the FIGURE in combination with a turbine engine since that is the preferred use of the system. However, it should be understood that the hot gas generating system may find use in other environments and should not be restricted to turbine applications except to the extent set forth in the appended claims.

The turbine engine includes a rotary compressor 10 coupled as by a shaft 12 to a turbine wheel 14. An annular nozzle 16 extends about the turbine wheel 14 and is in fluid communication with a combustor 18. In the usual case, the combustor 18 would receive compressed air compressed by the rotary compressor 10 via conventional ducting 19. By means of fuel injectors 20, fuel from a fuel source 22 will be injected into the combustor 16 to be burned. The resulting hot gases of combustion then are flowed through the nozzle 16 against the turbine wheel 14 to drive the same.

Power generating equipment such as an electrical generator, hydraulic pumps or the like are shown schematically at 24 and may be coupled by any suitable means to the turbine engine to be driven thereby In the usual case, the system thus described will be known as an auxiliary power unit (APU) or an emergency power unit (EPU) or may have aspects that make it a combination of both. In any event, when it is necessary to start the turbine engine from a quiescent state rapidly, the turbine wheel 14 may be driven by gases of combustion from an auxiliary combustor, generally designated 24, forming part of the invention and which serves as a hot gas generator. The auxiliary combustor 24 includes an enlarged, usually somewhat spherical, combustion chamber 26. One or more fuel injection nozzles 28 may be disposed within the chamber 26 to inject fuel from the source 22 therein.

The combustor 24 includes an outlet 30 which is connected via suitable ducting 32 to a choked nozzle 34.

The hot gas generating system also includes an oxidant storage vessel 36 which is adapted to store an oxidant under pressure. Typically, and as mentioned previously, the oxidant will be air or oxygen enriched air. In some instances, it may be molecular oxygen.

The storage vessel includes an outlet 38 that may be opened or closed by operation of a valve 40 to activate or inactivate the hot gas generator. Downstream of the valve 40 is a pressure regulating and controlling valve 42. A duct 44 connects the pressure regulator and controller 42 to a choked orifice 46 and a diffuser 47 located upstream of an inlet 48 to the combustion chamber 26. The choked orifice 46 is conventional and again serves to provide a constant flow rate irrespective of pressure variations downstream of it for a constant upstream pressure. The diffuser 47 is optional It is preferable that it be employed to minimize pressure drop losses and minimize oxidant wastage.

A bypass duct 50 extends from a point 52 downstream of the diffuser 47 and upstream of the combustion chamber 26 about the chamber 26 to the outlet 30. The same is operable to establish a flow path that is in fluid parallel with the flow through the combustion chamber 26. The bypass duct 50 includes a valve 53 that may be selectively moved therein to control the flow through the bypass conduit 50. In addition, an orifice or a flow restrictor 54 may be disposed within the bypass duct 50 to control the flow rate therethrough so as to achieve some desired degree of balance between flow through the bypass duct 50 when the valve 53 is open and the flow through the combustion chamber 26. A pressure and valve control system 56 which is operable to conjointly control the pressure regulator and control 42 and the valve 53 is also provided.

It can be demonstrated that for a given volume of the combustion chamber 26 necessary to achieve ignition for a given flow rate, such volume is greater than that required to maintain stable combustion after ignition. Consequently, by increasing the pressure applied to the upstream side of the choked orifice 46, the hot gas generating system of the invention including the combustor 24 and selectively operable bypass 50, 53, can handle an increased flow of gas or the combustion chamber 26 may be constructed with lesser volume, or combinations thereof, without comprising ignition reliability. In starting the hot gas generator, the pressure and valve control 56 may be operative to increase the pressure at the upstream side of the choked orifice 46 to thereby proportionally increase the flow rate through the system to desirably assure rapid acceleration of the turbine engine. At the same time, by opening the valve 53, some desired proportion of the increased flow is diverted about the combustion chamber 26 so that it does not affect ignition reliability. Once ignition is obtained, the valve 53 may be closed, and generally, the pressure at the upstream side of the choked orifice 46 reduced to a normal operating level. The result will be system operation at a design point which meets the requirements of accelerating the turbine engine to a desired power level within a short period of time. Needless to say, reclosing of the valve 53 and/or restoration of the normal pressure operating level need not occur simultaneously with ignition. Rather, it may occur once some desired percentage of rotational speed of the turbine engine is obtained.

While the invention has been described in connection with an embodiment that employs what might be termed dual control insofar as pressure to the choked orifice 46 may be varied by the regulator 42 and bypassing of the combustion chamber 26 achieves the variable flow rate through appropriate control of the valve 53, all to obtain the benefits of the invention, it should be observed that the benefits of the invention can also be achieved simply by regulating the pressure applied to the choked orifice 46 without employing the bypass 50. Similarly, the benefits of the invention may be achieved through use of the bypass 50 and the valve 53 without significant regulation of pressure applied to the choke-orifice 46.

As alluded to previously, ignitability and the ability to maintain stable combustion after ignition are related to the volume of the combustor, the air pressure, and the air flow rate. These components are generally related by an equation of the form E is equal to $V_c P^2/W$ where E is the ease of ignition or stable combustion;

$V_c$ is the volume of the combustor;

P is the pressure within the combustor; and

W is the air flow rate through the combustor.

The following hypothetical situation illustrates how the invention may be advantageously employed in sizing the combustion chamber 26 to achieve reliable ignition and stable combustion and yet minimize volume through appropriate operation of the bypass and/or the pressure regulator 42. It also illustrates how, if desired, one specific volume of combustion chamber 26 may act as a universal combustion chamber in widely varying systems with reliable ignition and stable combustion achieved simply by appropriately varying air flow and pressure.

For example, in a typical case, prior to ignition, pressure upstream of the choked orifice 46 might be at 400 psia and as a result of the presence of the choked orifice 46, and assuming that the bypass 50 is not employed, the pressure within the combustion chamber 26 might be about 100 psia prior to ignition. Upon ignition, the pressure within the combustion chamber 26 might elevate to about 300 psia. When these values are placed in the foregoing equation, it can then be seen that after ignition, the volume of the combustion chamber 26 is approximately nine times greater than is necessary because the ease of ignitability at ignition is the limiting case.

If the pressure upstream of the choked orifice 46 is doubled to 800 psia, both air flow and pressure prior to ignition within the combustion chamber 26 will double. It can be shown using the foregoing equation that the ease of ignition would then be considerably increased. That is to say, if under the initially mentioned condition of 400 psia applied to the choked orifice, ignition could not be had reliably because air flow was too high or the volume of the combustor was too low, reliable ignition could be had by raising the pressure applied to the choked orifice 46. In such a case, after ignition was obtained, the pressure could be regulated back to 400 psia and as a consequence, for this situation, the volume of the combustor after ignition would be only about 4½ times greater than that needed for stable combustion.

Stated another way, by momentarily increasing the supply pressure to the choked orifice 46, more flow, or less combustor volume, or a combination of both may be had without compromising ignitability. Alternatively, the same ignition reliability that is obtained by utilizing 400 psia applied to the choked orifice 46 may be obtained with half the combustor volume if supply pressure is momentarily doubled until ignition is achieved as mentioned previously.

As another illustration, if the components are such that application of 400 psia to the choked orifice 46 results in twice the air flow through the combustion chamber 26, this would reduce the ease of ignitability by approximately half and ignition would be endangered. However, it can be shown again that by doubling the pressure applied to the choked orifice 46 to, for example, 800 psia, until ignition is achieved, ease of ignitability returns to the value of the original example and the volume of the combustion chamber 26 is still sufficiently high that stable combustion is maintained notwithstanding the doubled flow rate.

Therefore, through appropriate operation of the pressure regulator 42, the capability of handling considerably more flow or combusting in a smaller combustor, or combinations of both may be achieved by a relatively simple expedient. Thus, a single volume combustion chamber 26 may be utilized in systems that otherwise vary substantially. For example, an undersized combustion chamber 26 for a given turbine could be employed along with a control schedule for the pressure regulator 42 that would increase the pressure applied to the choked orifice 46 sufficiently to achieve the desired ease of ignitability and then return to a desired operating value after ignition was achieved.

The foregoing examples demonstrate how varying combustor pressure accommodates changes in combustor volume and/or flow rate. Using the same approach, but employing the bypass alone, similar changes in combustor volume and/or flow rate can be had to accommodate various situations as necessary, including the use of a single combustor design as a universal combustor.

It will thus be appreciated that using the principles of the invention, one may downsize the combustor 24 to achieve desirable weight and volume advantages, particularly when the system is to be utilized in aircraft, without sacrificing starting reliability. Alternatively, one may obtain increasingly high flow rates to assure rapid acceleration of, for example, a turbine engine, without undesirably enlarging the combustion chamber 26. And, of course, combinations of both advantages, in varying proportions can likewise be obtained.

We claim:

1. A method of achieving a desired ease of ignitability of fuel in a combustor of a particular volume comprising the steps of
   a) introducing oxidant into said combustor through a choked orifice; and
   b) regulating the pressure of the oxidant applied to the choked orifice to achieve the desired ease of ignitability.

2. The method of claim 1 wherein step b) is performed by applying oxidant to the choked orifice at a given pressure until ignition of fuel within the combustor is achieved and thereafter applying oxidant to the choked orifice at a lesser pressure.

3. A method of achieving a desired ease of ignitability of fuel in a combustor of a particular volume comprising the steps of:
   a) applying an oxidant to an orifice at a pressure sufficient to choke the orifice;
   b) communicating oxidant passing through the choked orifice to said combustor and introducing the oxidant thereinto; and
   c) igniting fuel in the combustor; and
   d) thereafter reducing the pressure at which the oxidant is applied to the choked orifice.

4. The method of claim 3 further including the step of establishing an oxidant bypass flow path about said combustor during the performance of steps a) and b) and discontinuing the establishment of the bypass at or about the time of initiation of step d).

5. A method of achieving a desired ease of ignitability of fuel in a combustor of a particular volume comprising the steps of:
   a) applying oxidant to an orifice at a pressure sufficient to cause the same to be choked;
   b) delivering part of the oxidant passing through the orifice to the combustor while causing the remainder of the oxidant passing through the orifice to bypass the combustor;
   c) introducing and igniting fuel into the combustor; and
   d) upon ignition of the fuel in the combustor, reducing the pressure of the oxidant applied to the orifice and changing the amount of the oxidant bypassing the combustor.

* * * * *